(12) United States Patent
Morgan

(10) Patent No.: US 10,176,844 B2
(45) Date of Patent: Jan. 8, 2019

(54) ENCODING, DISTRIBUTION AND REPRODUCTION OF AUDIO MEDIA USING MECHANICAL IMAGE DIGITIZATION

(71) Applicant: Terence C. Morgan, Tukwila, WA (US)

(72) Inventor: Terence C. Morgan, Tukwila, WA (US)

(73) Assignee: Terence C. Morgan, Tukwila, WA (US)

( * ) Notice: Subject to any disclaimer, the term of this patent is extended or adjusted under 35 U.S.C. 154(b) by 0 days.

(21) Appl. No.: 15/783,105

(22) Filed: Oct. 13, 2017

(65) Prior Publication Data

US 2018/0040347 A1 Feb. 8, 2018

Related U.S. Application Data

(62) Division of application No. 14/926,472, filed on Oct. 29, 2015, now Pat. No. 9,830,945.

(51) Int. Cl.
| | |
|---|---|
| *G11B 20/22* | (2006.01) |
| *G11B 11/00* | (2006.01) |
| *G11B 20/04* | (2006.01) |
| *G11B 20/10* | (2006.01) |

(52) U.S. Cl.
CPC .............. *G11B 20/22* (2013.01); *G11B 20/04* (2013.01); *G11B 20/10009* (2013.01); *G11B 20/10527* (2013.01); *G11B 2020/10546* (2013.01)

(58) Field of Classification Search
None
See application file for complete search history.

(56) References Cited

U.S. PATENT DOCUMENTS

| | | | | | |
|---|---|---|---|---|---|
| 3,932,032 | A | * | 1/1976 | Weinstein | G03B 31/02 352/11 |
| 4,496,997 | A | * | 1/1985 | Ohtsuki | G11B 20/1262 360/13 |
| 4,587,572 | A | * | 5/1986 | DiGiulio | G11B 27/022 386/278 |
| 4,600,280 | A | * | 7/1986 | Clark | G11B 7/0032 352/25 |
| 4,832,481 | A | * | 5/1989 | Beauviala | G03B 31/00 352/12 |
| 5,461,597 | A | * | 10/1995 | Amano | G11B 7/28 360/15 |
| 5,530,501 | A | * | 6/1996 | Bell | G03B 17/24 396/310 |

(Continued)

OTHER PUBLICATIONS

Phonographic Sound Extraction Using Photography and Signal Processing, Stotze et al, Digital Signal Processing, May 19, 2006.*

*Primary Examiner* — Tan X Dinh
(74) *Attorney, Agent, or Firm* — Clark A. Puntigam; Jensen and Putigam, P.S.

(57) ABSTRACT

The system and corresponding process includes a system for producing a mechanical image of original audio source media and a system for encoding the mechanical image information into a digital file. A processing system recovers the mechanical image information from the digital file at a receiving end. Audio processing is used to produce the original audio source material without the standard losses associated with digital encoding of audio material.

3 Claims, 11 Drawing Sheets

(56) References Cited

U.S. PATENT DOCUMENTS

| | | | |
|---|---|---|---|
| 5,639,585 A * | 6/1997 | Callahan, Jr. | G03B 31/02 352/11 |
| 6,829,207 B1 * | 12/2004 | Singer | G11B 7/28 369/107 |
| 2001/0028406 A1 * | 10/2001 | Tarnoff | G11B 27/028 348/441 |
| 2004/0041943 A1 * | 3/2004 | Fecht | G11B 27/034 348/441 |
| 2005/0002319 A1 * | 1/2005 | Fadeyev | G11B 3/70 369/272.1 |
| 2005/0105729 A1 * | 5/2005 | Stwertka | H04N 5/846 380/202 |
| 2005/0163462 A1 * | 7/2005 | Pratt | G11B 27/11 386/233 |
| 2005/0165840 A1 * | 7/2005 | Pratt | G06F 17/30017 |
| 2016/0274308 A1 * | 9/2016 | Giessen | G02B 6/3802 |
| 2016/0282812 A1 * | 9/2016 | Urbach | G03H 1/0476 |
| 2017/0125054 A1 * | 5/2017 | Morgan | G11B 20/22 |

\* cited by examiner

US 10,176,844 B2

ENCODING, DISTRIBUTION AND REPRODUCTION OF AUDIO MEDIA USING MECHANICAL IMAGE DIGITIZATION

PRIOR APPLICATION

This is a divisional application of currently pending application Ser. No. 14/926,472, filed on Oct. 10, 2015.

TECHNICAL FIELD

This invention relates generally to digital encoding, distribution and storage of audio media while maintaining the quality of the original audio media.

BACKGROUND OF THE INVENTION

Audio media, in the form of original audio tapes and discs provides the highest quality recorded audio experience. Conventional digital encoding and reproduction of audio media from the digital format has the advantage of fast and convenient distribution and storage of audio media, enabling the widespread enjoyment of audio media. However, conventional digitization of audio media has come at the cost of the quality of the original audio. All current analog media digitization techniques rely on 100% lossy systems, meaning that no original component of the original analog audio signal remains in the digitized signal. The reproduced playable audio version is a 100% estimated version of the original audio signal. In terms of the audio spectral realism, almost, 45 db of the original dynamic headroom is no longer present.

As a result, there is an increasing demand for higher quality audio, and this has led to a resurgence in the popularity of vinyl recordings. However, the problem of convenient distribution and/or storage of the original analog audio media remains. The demand for higher quality audio in the distribution market has been directed toward improvements in digital signal processing of the original analog audio, but relatively little improvement has been achieved. One alternative is the offering of a vinyl LP or a high-density cassette tape, which contains the original audio along with compact disc and digital streaming media distribution options. This still does not satisfy the quality issue of directly distributed digital media.

It is hence desirable to maintain the quality of the original audio recording while having the capability of digital distribution and storage.

SUMMARY OF THE INVENTION

Accordingly, the present invention is a system and corresponding process for maintaining quality of audio recordings, comprising: a mechanical production system for producing a mechanical image of original audio source media; a processing system for encoding the mechanical image information into a digital file capable of being transmitted or stored; a processing system for recovering the mechanical image information or from digital information in the digital file; and audio processing circuitry to produce the original audio source media without standard losses associated with digital encoding.

DETAILED DESCRIPTION OF THE INVENTION

As indicated above, current distribution of digitized audio media results in a 100% loss of the original analog audio signal. While the media content may be encoded accurately, the inherent mechanical acoustic information is lost. The present invention is a system and a process which enables digital encoding, distribution and storage of analog audio media while retaining the original audio quality, specifically both the audio content and the mechanical acoustic information when reproduced and played. This is accomplished by an arrangement referred to herein as mechanical image digitization.

Figure 1:
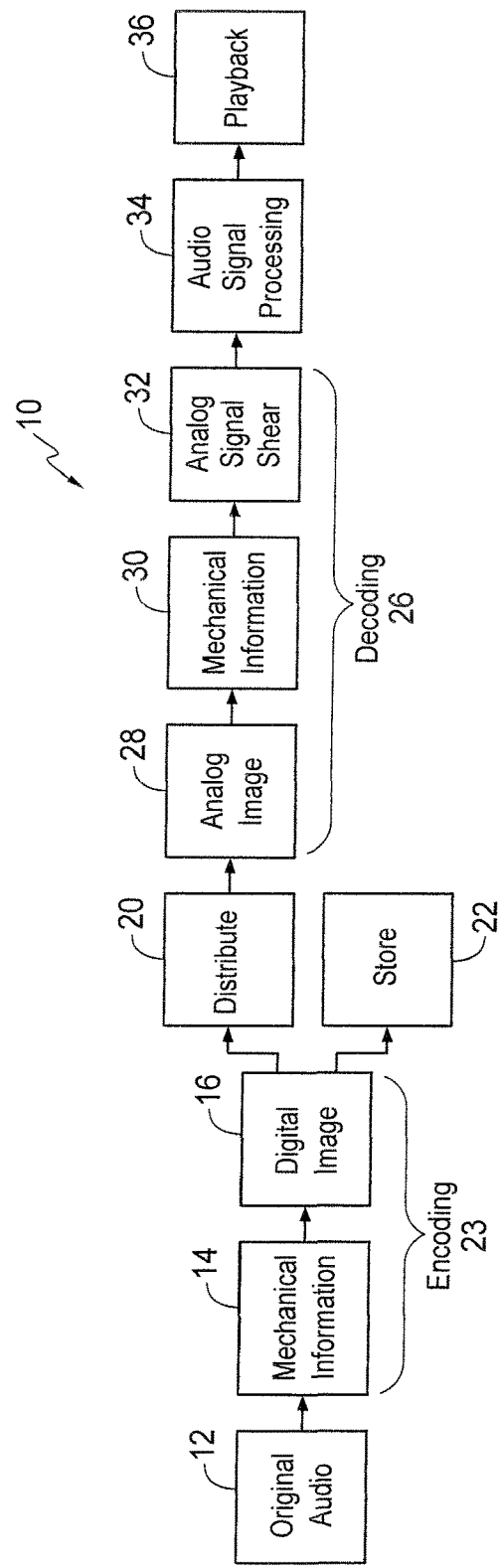
FIG. 1 is a block diagram of the system and process of the present invention.

FIG. 1 illustrates in block diagram form the basic concept of the invention, showing generally at 10. The original audio is represented at 12. The mechanical information from the original audio is represented at 14, specifically an image of the original mechanical process that created the media, including both vinyl and tape images. This image information is then digitized, as shown at 16. This is referred to in combination herein as digital encoding 23, i.e. digitization of the mechanical image information. The digital signal may be either distributed in same manner or stored as shown at 20 and 22. This present digitizing of mechanical image information basically replaces the current system of digitizing the analog audio media by analog to digital converters, along with the possible use of various signal processing algorithms designed to improve quality. When the digital image is received at a play back location, such as a steaming destination, decoding occurs, referenced at 26. Decoding in the present system is an analog 28 of the encoding process, using conventional digital to analog converter circuitry. The analog includes mechanical information 30 which is then processed into an analog stream of signals 32. The analog stream of signals mirrors the original analog audio recording. The signals are then applied to audio transducers and to a conventional audio signal processing system for playback of the audio, shown at 34 and 36, respectively. The playback system can take various forms, producing not only the original audio content but the original acoustic information, basically reproducing the original audio.

Accordingly, the present invention has the advantage of digital capability of convenient and fast distribution and/or storage, while retaining the original audio quality in playback.

Figure 2:
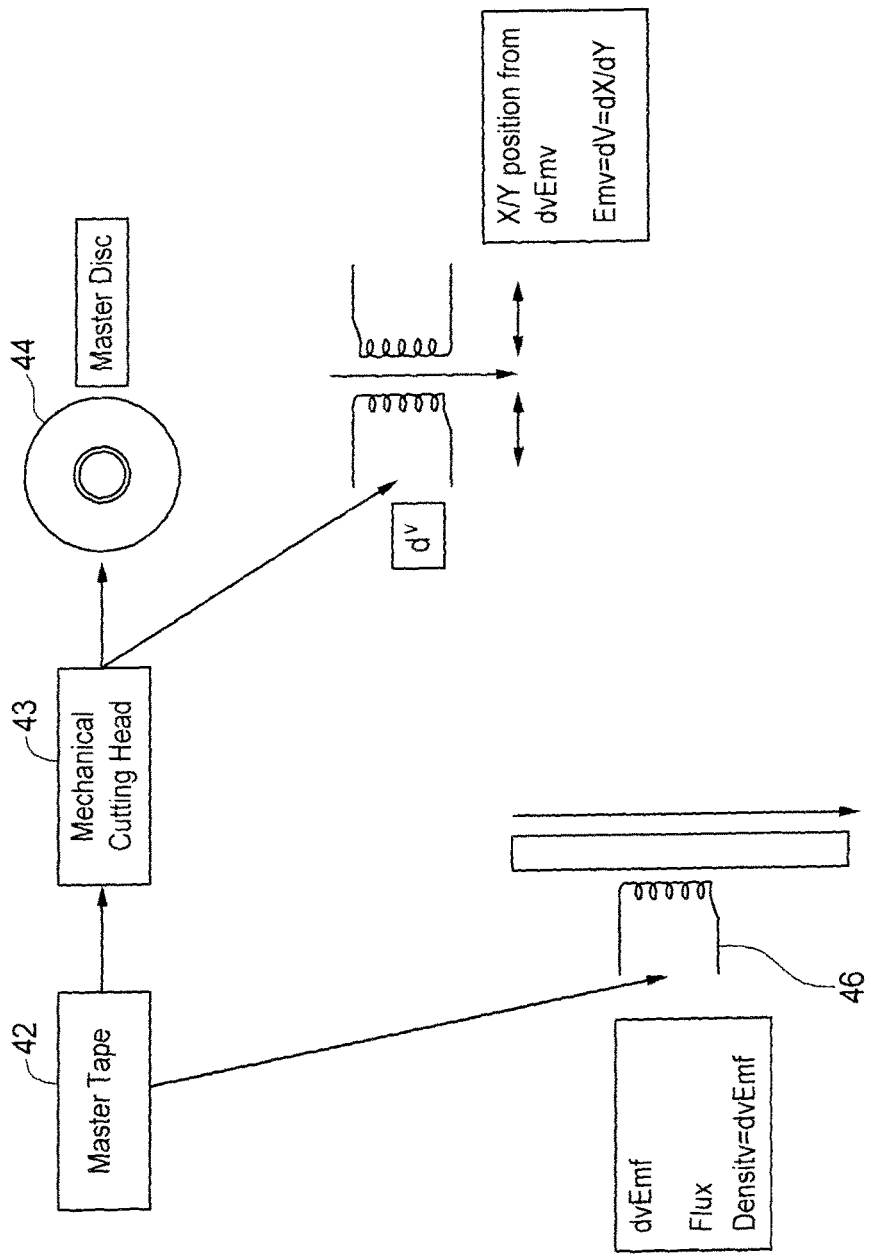
FIG. 2 is a block diagram of the various types of mechanical images produced from a master audiotape recording.

FIG. 2 shows several types of mechanical images which may be used. An original audio recording can be produced in various venues, including a recording studio, performance hall or other venue. This is commonly referred to as a master tape 42. The master tape is the original recorded audio material, i.e. stereo or multi-channel, which is then converted to mechanical information which is normalized for various downstream reproduction processes.

In one example, a mechanical cutting head 43 is used to produce a master disc 44. The master disc then is used to produce multiple vinyl copies.

Changes in the differential voltages $d^V$ drive electromagnetically the cutting head used in manufacturing the master disc. The geometry of the disk groove and the reproduced analog signal is directly proportional to the differential drive voltages of the original Emv of the master recording, minus the mechanical bandwidth reduction which occurs because of the mechanical limitations of phonographic recordings. The x/y position is determined by dvEmv, where Emv=dv=dx/dy.

Alternatively, as shown at 46, the changes in the differential voltages are used to electromagnetically drive the production of varying densities of magnetic flux on magnetic tape. The geometry of the flux density and the reproduced analog signal are directly proportional to the differential drive voltage of the original Emf of the master recording minus the mechanical bandwidth reduction which occurs because of the mechanical limitation of tape flux density. The flux density=dvEmf.

Both of the above mechanical image processes, namely, the mechanical cutting head process and the magnetic tape flux density process are conventional and are hence not described herein in further detail.

Figure 3:
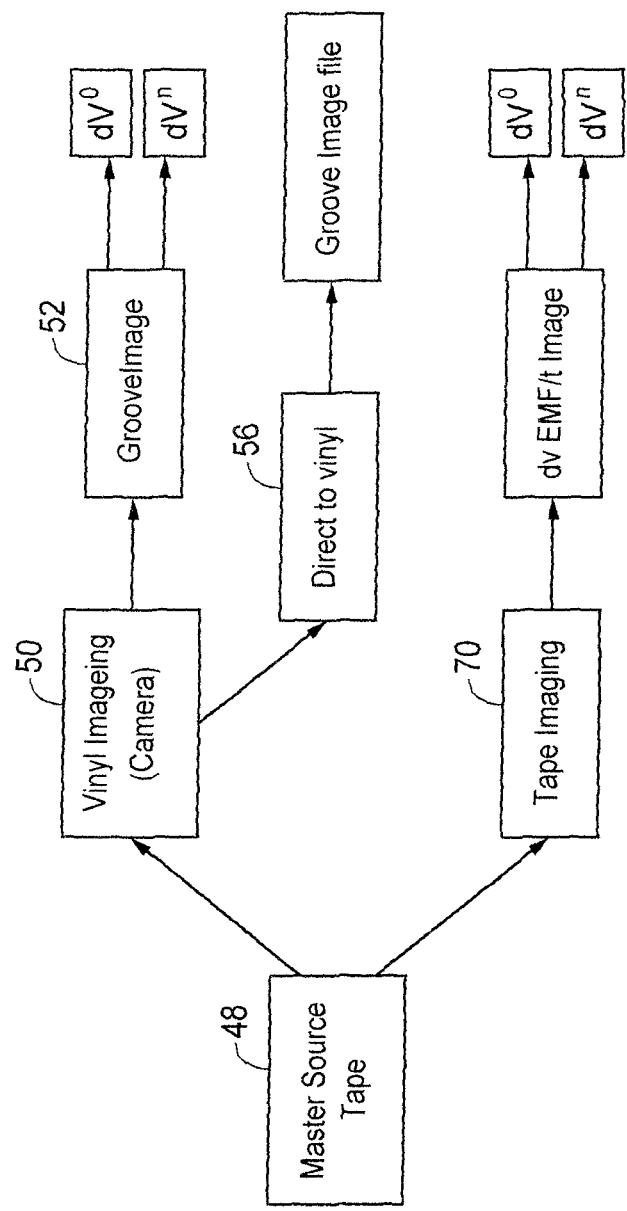
FIG. 3 is a block diagram showing several alternatives of the system of the present invention.

Referring now to FIG. 3 in accordance with the present invention, the master source tape 48 containing the original audio media can be used to produce a vinyl image 50 in the form of a mechanical image of the actual track grooves of the vinyl master. This can be done by a camera or other photographic device. This image can be used either as an image copy for direct vinyl production 56 on a 3D printer, as discussed in more detail below, or other dimensional printing process with further encoding for the production of differential voltages.

Figure 5:
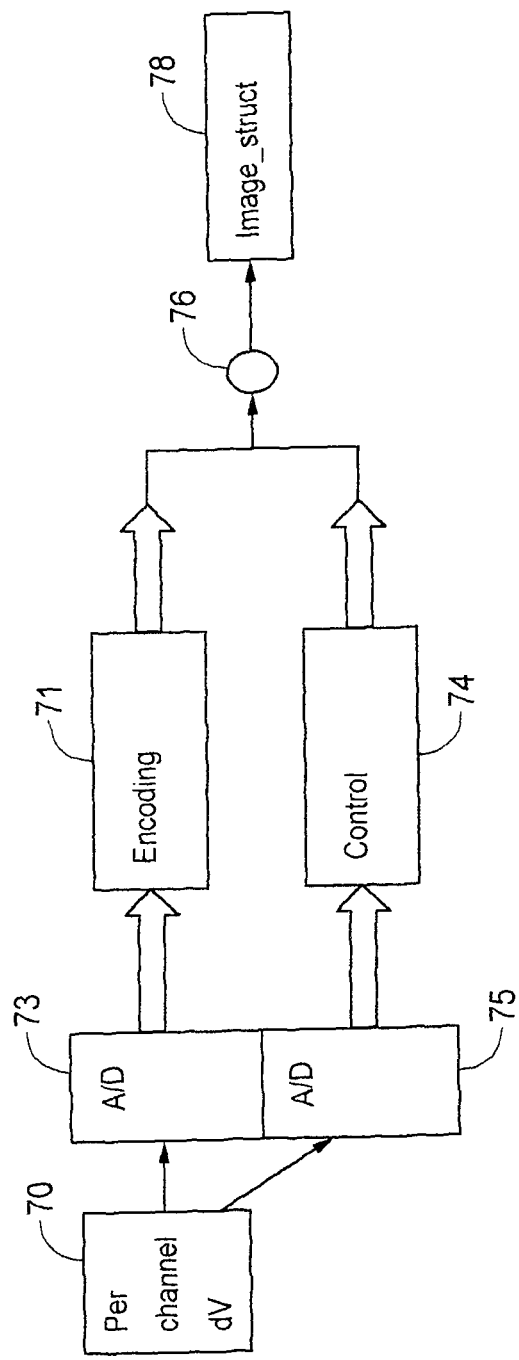
FIG. 5 is a diagram showing encoding for the systems for FIG. 3.

Alternatively, the groove image can be processed for digital use. Groove image 52 represents a digital encoding of the parameters of the master track information including the x/y position of the mechanical image and other mechanical audio information, including resonance, peak rise times, etc, using various encoding techniques and geometric smoothing to maintain the spectral quality of the original analog source material. One encoding example is dictionary encoding, which can be accomplished in many different ways. Other examples include non-dictionary PPM and PAQ techniques: this encoding results in a standard distributable digital file consisting of the image structure and control information to enable reproduction with specific mechanical drivers as an audio signal. This arrangement is shown in FIG. 5, described below.

Figure 4:
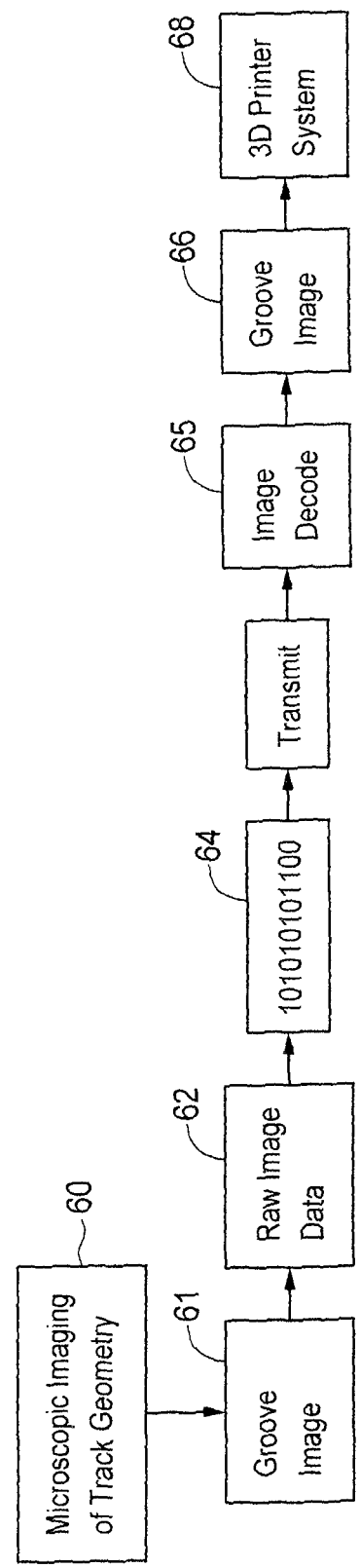
FIG. 4 is a more specific block diagram of one alternative.

The direct to vinyl arrangement 56 is shown in FIG. 4. It includes a microscopic imaging 60 of the track geometry, which produces the actual groove image 61 from a vinyl long playing recording, resulting in a raw image file 62. The raw image file contains the geometric data of the track image in any one of various standard image creating formats, e.g. jpg, bmp, represented at 64. The image is then transmitted, downloaded as a digital file and decoded at a receiving end, shown at 65. Standard image reproduction processes recreate the groove image, geometrically arranged to be an exact copy of the original track geometry, shown at 66. The decoded output is then provided to a 3D printer system or other dimensional printing device, to produce an exact print analog copy shown at 68, which can be played directly.

Again referring to FIG. 3, the master source tape can also be used to produce a tape for reproduction purposes. The flux density on the tape is imaged at 70. Digital encoding of the parameters of the master source tape, representing the tape flux density and other mechanical information resonance, peak use times etc. is accomplished using conventional encoding techniques and geometric smoothing, as discussed above with the groove image embodiment to produce a distributable digital file. The resulting voltages $dv^o/dv^n$ come from the dvEMF/t image.

Referring now again to FIG. 5, each voltage dv channel, shown at 70, produced by any one of the previous processes, e.g. track imaging, flux density or pattern geometry, from the mechanical image (dx/dy) results in an output structure which can be digitally distributed. The voltage changes (dv) per channel can be encoded using dictionary or other encoding 71. The voltage control structures are stored in a sorted structures table with the output of the process stage being a list of pointers to the best fit structure for the encoding. The analog voltage is stored in a digital format in accordance with standard analog to digital conversion processing 73. Control parameters, represented at 74, with A/D processing at 75, including other original media mechanical information and post processing control information are included for the signal control of the decoding process at the receiving end with post processing drivers and devices. The voltage and control information is shown in combination at 76.

Figure 6:
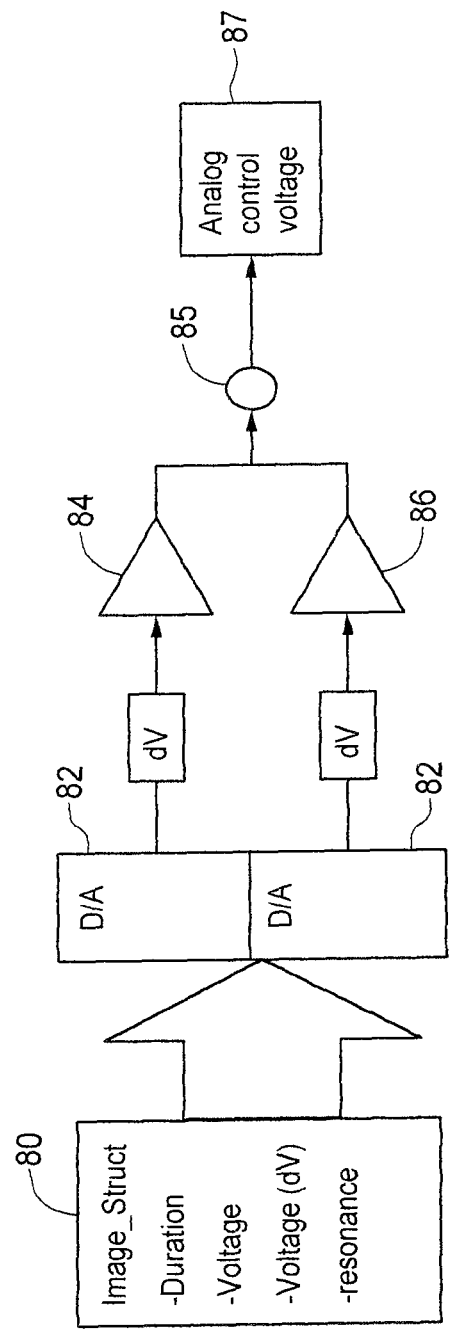
FIG. 6 is a block diagram showing the digital to analog conversion at a receiving end of the system.

The resulting image structure 78 for digital to analog conversion at a receiving end of the digital transmission is shown in FIG. 6. The image structure containing the mechanical differential data and control information necessary for driving the analog transducer devices or digital playback devices are shown as a group at 80. The image structure information comprises voltage, duration and resonance information. This information is sent to digital to analog converters shown generally at 82. These convert the digital image information into analog differential voltages (dv) to drive the output sections, i.e. a differential drive output 84 and a control gating and referencing circuit 86. The output driver device shown in FIG. 6 is a VCO (voltage controlled oscillator) 85 controlled by the output of the control decoder and is representative of other driver arrangements, e.g. FET, selenium, photo drivers. An analog control voltage 87 results.

Figure 7:
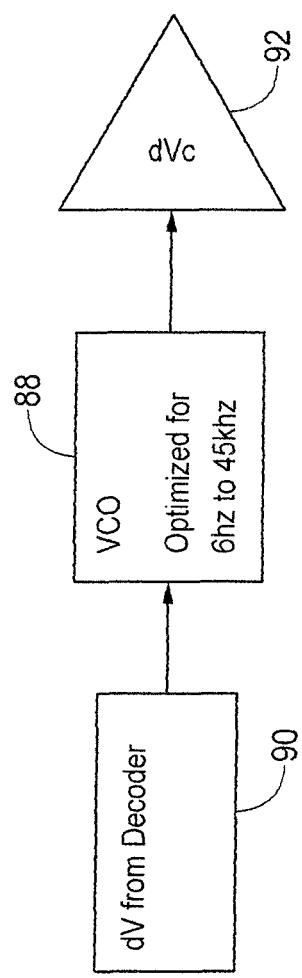
FIG. 7 is a block diagram of one embodiment of audio processing at the receiving end.

FIG. 7 shows a VCO 88 embodiment. A VCO receives a dv, differential voltage, 90 from the analog output of the digital to analog converter. The VCO is optimized for 20 Hz to 60 KHz in this embodiment. The output of VCO 88 is applied to a preamp/equalization circuit 92.

Figure 8:
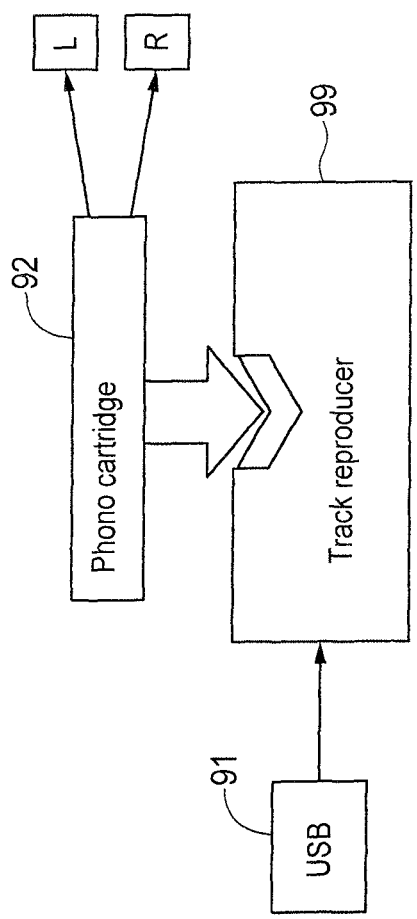
FIG. 8 is a block diagram of another audio processing embodiment.

Another example is a mechanical track reproducer, show in FIG. 8. The input is a data stream 91 in a USB format, which contains the L/R (left/right) multi channel driver voltage information 92. This information is provided to a track reproducer 99, which converts the driver voltage information into mechanical movement (x,y), axis deflection by means of a linear variable displacement transducer or other micro movement device such as a stepper motor. The embedded phonographic cartridge is deflected by the track reproducer to produce analog audio signals that can be applied directly to standard audio circuitry.

Figure 9:
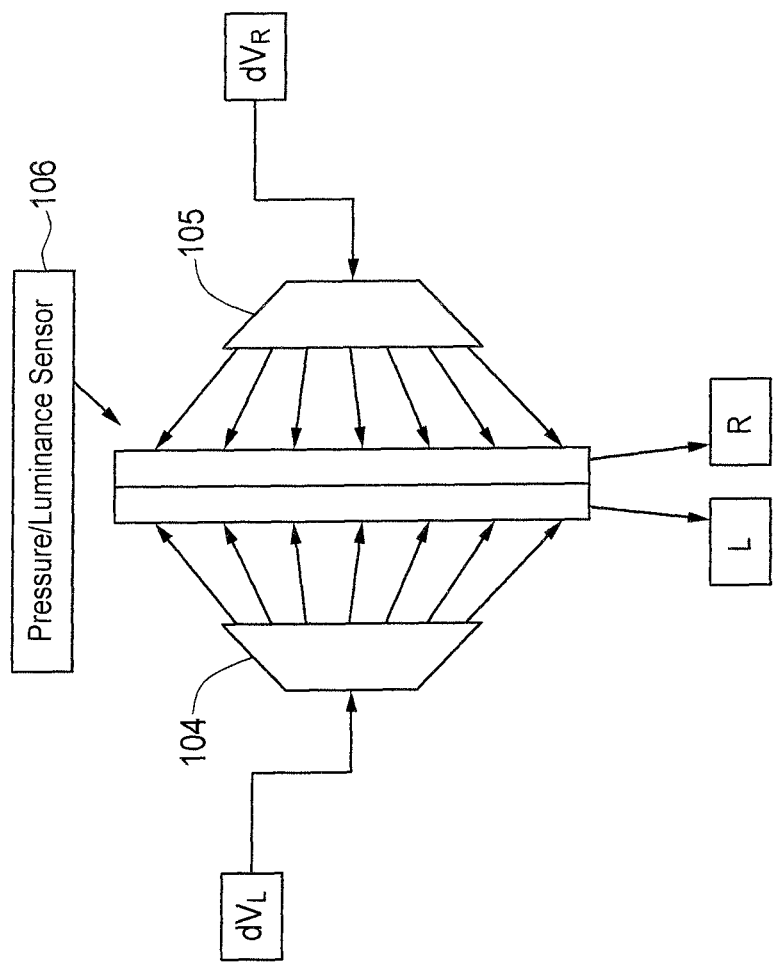
FIG. 9 is a block diagram of another audio processing embodiment.

Another example is a selenium analog reproduction device, shown in FIG. 9. Differential voltages $dV_L$ and $dV_R$ developed from the encoder image structures are applied to LED sources 104 and 105 to produce a lumen intensity controlled by the changes in the applied voltage. A pressure/lumen sensor 106 produces analog audio driver signals (L,R) that can be applied to standard audio reproduction circuitry.

Figure 10:
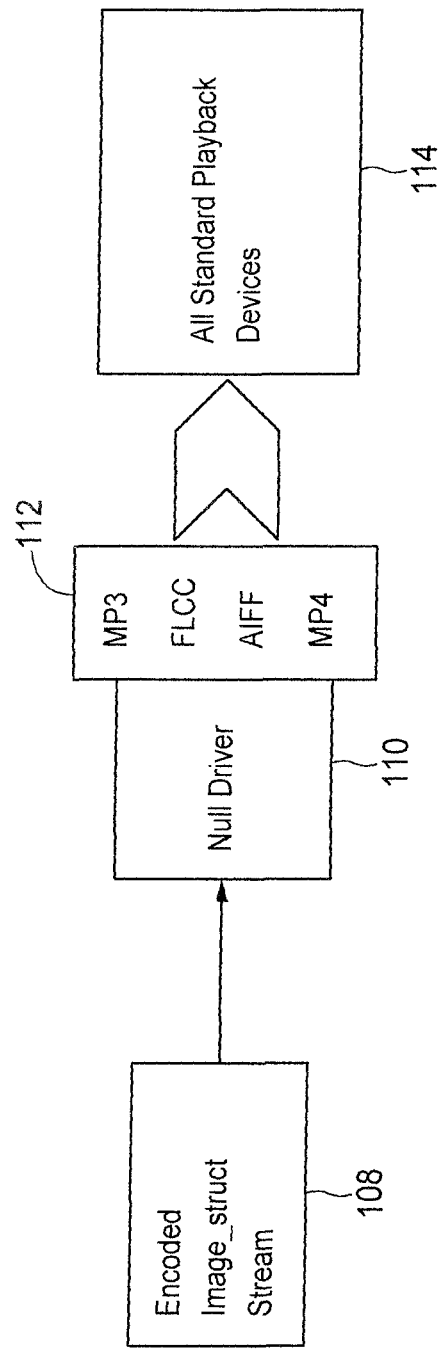
FIG. 10 is a block diagram of an image stream for playback at a receiving end.

FIG. 10 shows an encoded image structure 108 which is the output of the mechanical image encoding process described above. A null driver 110 (software emulator), receives the recording data stream and converts it directly to standard available audio file formats, MP3, FLCC, etc 112. The various files are digitally compatible for playback on various standard systems.

Figure 11:
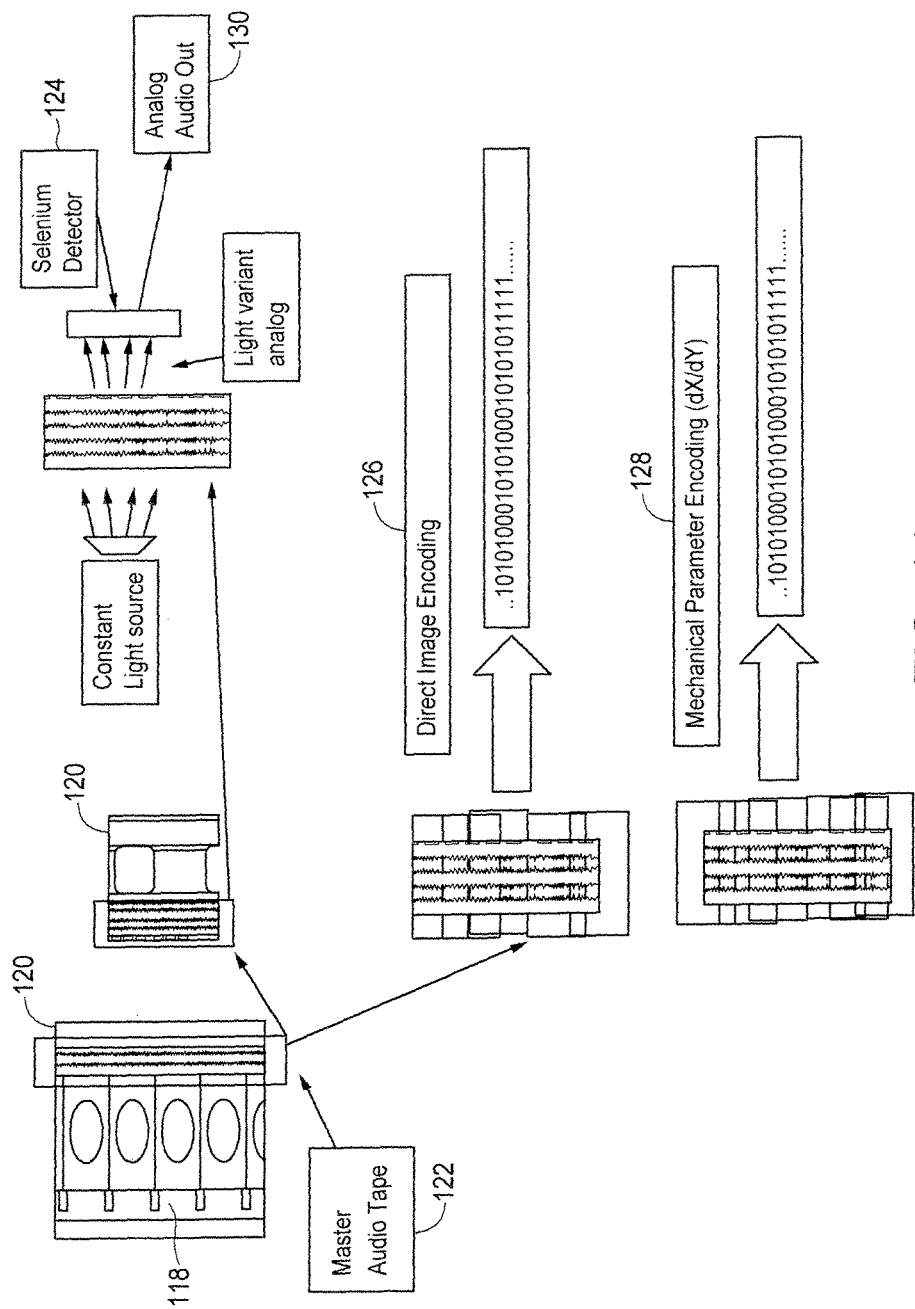
FIG. 11 is a block diagram showing encoding from film.

A related aspect of the present invention concerns the use of the present invention relative to film. Referring to FIG. 11, a projectable film frame 118 is shown having an audio track 120. The master audio tape information 122 is prerecorded and added during the manufacture of the film. The audio track can be directly imaged, such as by a light source, for example, a selenium detector 124. The imaged audio track can also be encoded in the same way as the mechanical images discussed above, with direct image encoding at 126, or mechanical parameter encoding at 128. A digital data stream can be distributed or stored, with the original audio recovered at the receiving end, as discussed above, shown at audio out 130.

Accordingly, the present invention, in various embodiments, is directed toward a system and process in which a mechanical image of an original audio source is produced, the mechanical image having all of the acoustic capability of the original audio. This signal can then be digitized and conveniently distributed or stored. The digital signal at the recovery end can then be processed to recover the original mechanical information, which can be processed using standard conventional audio processing systems to produce an audio play back which has the same quality as the original audio.

Although a preferred embodiment of the invention has been disclosed for purposes of illustration, it should be understood that various changes, modifications and substitutions may be incorporated in the embodiment without departing from the spirit of the invention, as defined by the claims which follow.

What is claimed is:

1. A system for maintaining quality of audio recordings, comprising:
   wherein the audio recording is an original vinyl audio recording containing original analog recording audio;
   a mechanical production system for producing a groove image of the track geometry of the vinyl audio recording, resulting in an image file containing the geometric data of the track image in an image creating format, the image file being transmittable to a receiving end;
   a decoding mechanism at the receiving end for the transmitted image file;
   an image reproducing system recreating the groove image, geometrically arranged to be a copy of the vinyl recording track geometry containing the original analog recording audio; and
   a dimensional printing device for printing the vinyl audio recording from the recreated groove image, playable directly.

2. The system of claim 1, wherein the dimensional printing device is a 3D printer.

3. The system of claim 1, wherein the image of the track geometry is a microscopic image.

\* \* \* \* \*